United States Patent [19]

Standish

[11] Patent Number: 5,671,598
[45] Date of Patent: Sep. 30, 1997

[54] FORWARD MOUNTED PIVOTING DOOR REVERSER WITH EFFLUX CONTROL DEVICE

[75] Inventor: Robert R. Standish, Gazeran, France

[73] Assignee: Societe de Construction des Avions Hurel-Dubois, Meudon la Foret, France

[21] Appl. No.: 567,158

[22] Filed: Dec. 5, 1995

[30] Foreign Application Priority Data

Sep. 13, 1995 [EP] European Pat. Off. .............. 95402067

[51] Int. Cl.$^6$ .................................................... F02K 1/62
[52] U.S. Cl. ................... 60/226.2; 239/265.29; 244/110 B
[58] Field of Search ................... 60/226.2, 262; 244/110 B; 239/265.19, 265.27, 265.29

[56] References Cited

U.S. PATENT DOCUMENTS

| | | |
|---|---|---|
| 3,097,484 | 7/1963 | Andre et al. . |
| 3,567,128 | 3/1971 | Urguhart et al. ................ 239/265.29 |
| 3,918,832 | 11/1975 | Shuttleworth et al. . |
| 4,485,970 | 12/1984 | Fournier et al. . |
| 5,284,015 | 2/1994 | Carimali et al. ..................... 60/226.2 |
| 5,396,762 | 3/1995 | Standish . |

FOREIGN PATENT DOCUMENTS

| | | |
|---|---|---|
| 0 558 381 | 9/1993 | European Pat. Off. . |
| 35 00 218 | 8/1985 | Germany . |
| WO94/24430 | 10/1994 | WIPO . |

*Primary Examiner*—Charles G. Freay
*Attorney, Agent, or Firm*—Young & Thompson

[57] ABSTRACT

A thrust reverser comprised of two pivoting doors for engines mounted on an aircraft rear fuselage. For thrust reversal, the two pivoting doors are rotated into the mixed flow by two actuators, one actuator per door. On the extremities of each pivoting door, efflux flow turning devices are installed. These devices are removable boxes comprised of deflectors that can be oriented to turn the flow. Two boxes are required for each pivoting door.

3 Claims, 6 Drawing Sheets

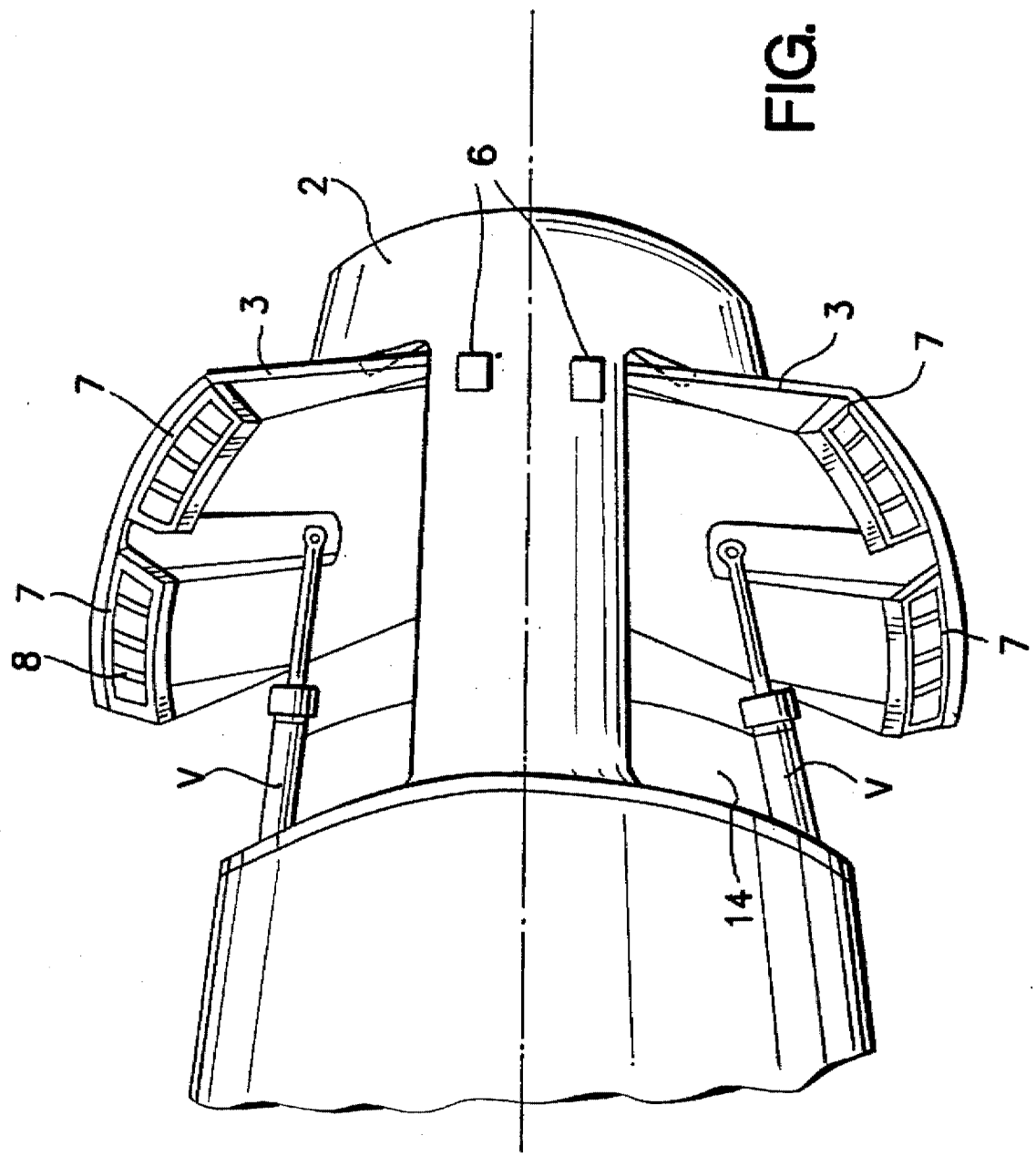

FORWARD MOUNTED PIVOTING DOOR REVERSER WITH EFFLUX CONTROL DEVICE

BACKGROUND OF THE INVENTION

This invention relates to a thrust reverser for turbo-fan engines used on aircraft, more particularly to a pivoting door thrust reverser having devices for controlling the efflux pattern to avoid and reduce aircraft impingement.

In turbo-fan engines with mixed hot and cold flows, the reverser is provided to reduce the stopping distance of the aircraft and to increase safety when landing on a wet or icy runway.

This thrust reverser is comprised of pivoting doors that pivot about axes, from a stowed position to a deployed position. When deployed, the doors block the mixed flow and eject the flow in a forward direction. When the turbo-fan engine is mounted close to the aircraft fuselage and tail, efflux impingement on these structures can occur. The objective of this invention is to avoid and reduce aircraft impingement.

A type of reverser showing door like vanes is disclosed by BREWER in U.S. Pat. No 2,847,823. There are no apparent flow turning devices in this door-vane arrangement.

Another type of reverser showing pivoting doors is disclosed by URQHART in U.S. Pat. No. 3,567,128. This design shows extendable end plates in order to improve reverse thrust efficiency, but does not show efflux control devices.

Another type of reverser showing pivoting doors is disclosed by BELBOUCHE in U.S. Pat. No. 4,858,430. This patent claims improvements to FOURNIER U.S. Pat. No. 4,485,970 extending the kicker plate, initially shown by FOURNIER and referred to as a deflector nose. A baffle is shown by BELBOUCHE to further direct the air in the forward direction. This baffle or extended deflector does not perform as an efflux control device.

Still another design showing pivoting doors is disclosed by LAWSON in U.S. Pat. No. 5,230,213. As an improvement to FOURNIER in U.S. Pat. No. 4,485,970, LAWSON shows strakes added to the pivoting door inner surface in order to deflect the reversed air flow away from the fuselage and other structures. These strakes are shown on FIG. 2 and are referred to as $S^2$.

These strakes or vanes are similar to the strakes or vanes used by CARIMALI in U.S. Pat. No. 5,284,005 and similar to the strakes previously used on production TORNADO aircraft thrust reversers. These strakes are shown on FIG. 1 and are referred to as $S^1$.

Strakes of the aforementioned type are installed on the flow surface of the pivoting doors and are independent of the end plates or kicker plates. The strakes extend sufficiently aftwards to be in the path of the airflow when the reverser doors are in the stowed position so that there is a risk of perturbing the air flow performance.

Another type of device for thrust reverser efflux control is shown by STANDISH in U.S. Pat. No. 5,396,762. The vanes shown is this patent are attached to extremity of the pivoting door, more particularly for a four door under wing arrangement. The vanes are fixed in their angle orientation.

Where the engines are mounted on the aircraft fuselage, the aforementioned systems do not provide optimum control of the reverse air flow, to assure against tail buffering.

There is, therefore, a need for improved efflux control without a degradation of reverse thrust performance. Other considerations should be low weight and maintenance simplicity of the efflux control device.

SUMMARY OF THE INVENTION

This invention provides improved efflux control for a pivoting door type reverser used in turbo-fan engines.

More particularly, the invention provides a thrust reverser for a turbo-fan engine with mixed hot and cold airflow, said thrust reverser being mounted on the aft fuselage of an aircraft, the thrust reverser comprising:

thrust reversing pivoting doors, installed forward of an aft ring exit nozzle structure, and movable from a stowed position in which they complete the fan duct fairing of the engine and do not interfere with said airflow to a deployed position in which they block the mixed airflow and direct it in a forward direction, according to a reverse thrust efflux pattern;

a pivoting door actuator attached to the center of each pivoting door for moving the door from said stowed position to said deployed position;

deflector box assemblies, on the forward extremity of each door, mounted perpendicularly to the door, in order to direct said reverse thrust efflux pattern away from the aircraft fuselage and tail surfaces, each deflector box assembly comprising:

a box frame without front and back plates, a plurality of deflectors that pivot within the box frame and that can be oriented to a desired angle in order to control the efflux flow pattern.

For aircraft using rear fuselage mounted engines, the thrust reverser according to the invention will reduce the flow impinging on the horizontal tail, the vertical tail and the aft fuselage.

The invention has thrust reverser pivoting doors, that are forward mounted, between the aft shroud and the engine attach flange. On the forward extremity of the pivoting doors, flow turning devices are installed. These devices are designed as individual flow deflector boxes.

These flow deflector boxes are bolted on line replaceable units, that can be changed on the aircraft as required, or an adjustment can be made without removing the boxes, in order to reduce maintenance time.

In prior art turbo-fan engines, the flow turning devices are fixed. This invention is an improvement in that the individual deflectors of each box assembly can be pivoted and oriented to optimize the efflux flow turning angle. The orientation of the deflector angles can be adjusted by a simple maintenance operation, without removing the deflector box.

It has been experienced that during flight testing and entry into service, aerodynamic buffering problems can occur. This invention can be used to correct the efflux control problems without having to retrofit the aircraft with new hardware. As service continues, adjustment or orientation of the deflector angles can be made during maintenance intervals.

It should be noted that the deflector angles, with the pivoting door deployed, are adjustable in a radial direction, i.e. inboard or outboard, relative to the aircraft fuselage. This invention is particularly adapted to aircraft equipped with two vertical thrust reverser pivoting doors, forward mounted, between the aft shroud and the engine attach flange.

BRIEF DESCRIPTION OF THE DRAWINGS

FIG. 4 is a perspective view of the thrust reverser corresponding to the present invention.

DETAILED DESCRIPTION OF THE INVENTION

In the following description the thrust reverser is shown to equip a turbo-fan engine mounted on an aircraft aft fuselage.

Figure 1:
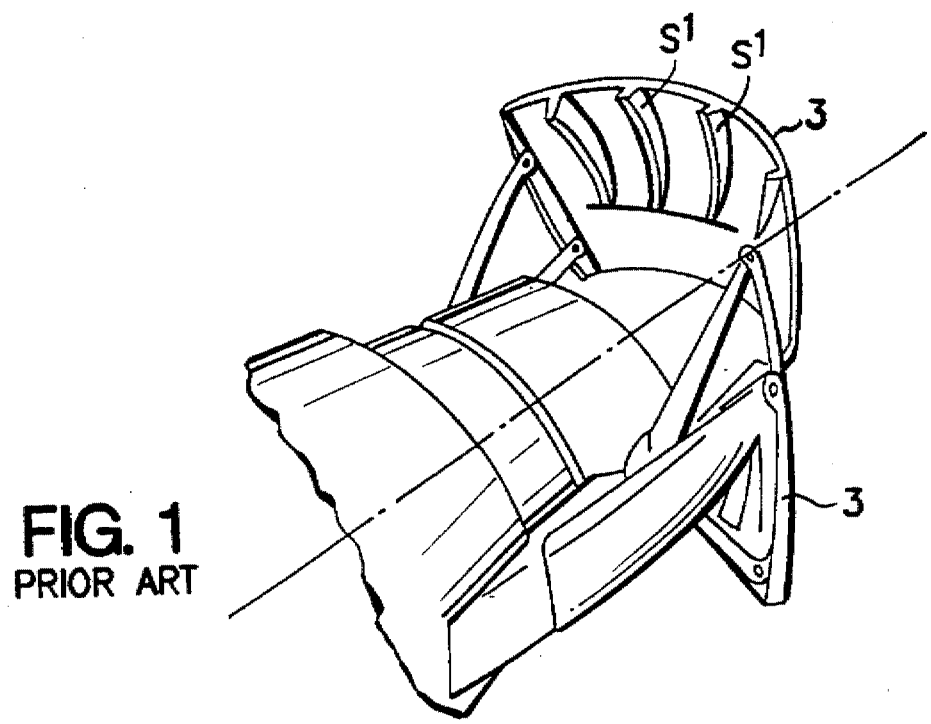
FIG. 1 is a partial perspective view of a known pivoting two-door type thrust reverser.
Figure 2:
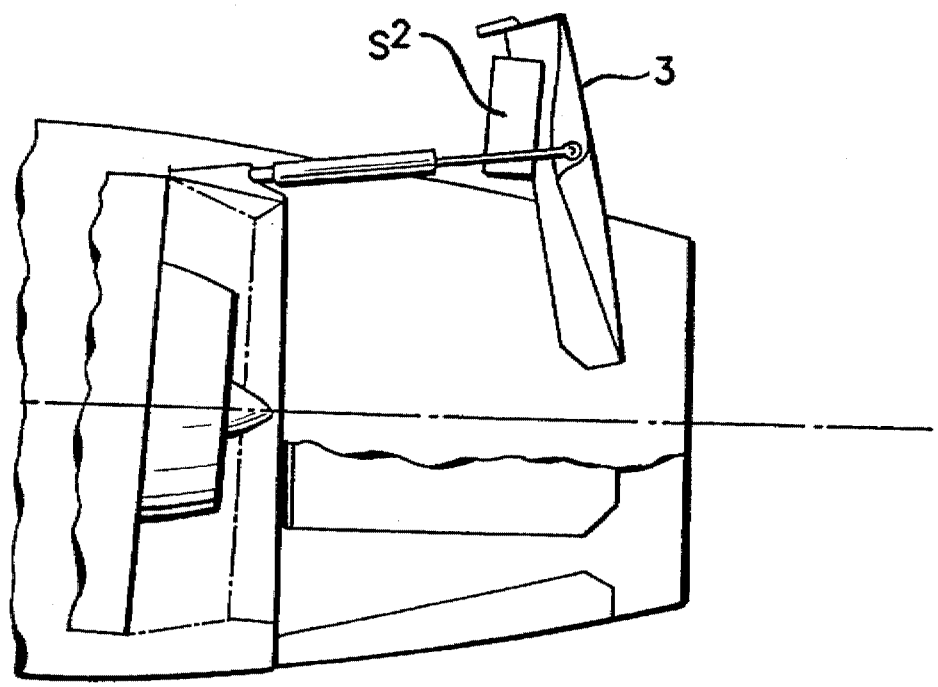
FIG. 2 is a partial, longitudinal cross-sectional view of a known two-door type thrust reverser, with folding strakes.

Referring to FIGS. 1 and 2 there is seen two known thrust reversers for turbo-fan engines.

Both reversers have devices shown for controlling efflux flow, i.e. strakes $S_1$ (FIG. 1) and $S_2$ (FIG. 2) provided on the doors 3. Although such designs can be generally effective, there are limits for some conditions, particularly for an engine mounted close to the aircraft fuselage and tailplane.

Figure 3A:
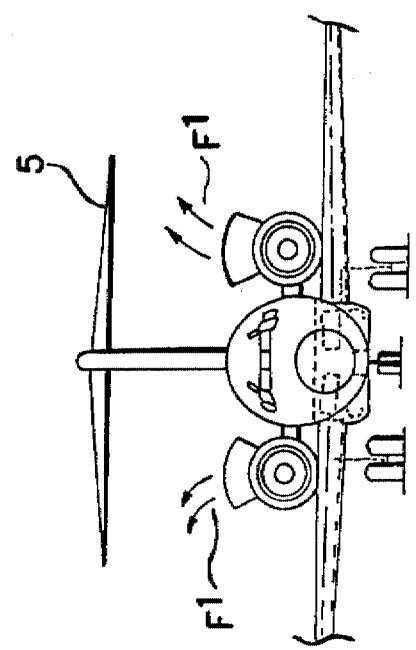
FIG. 3a is a front view of an aircraft showing the reverser doors in deployed condition.
Figure 3B:
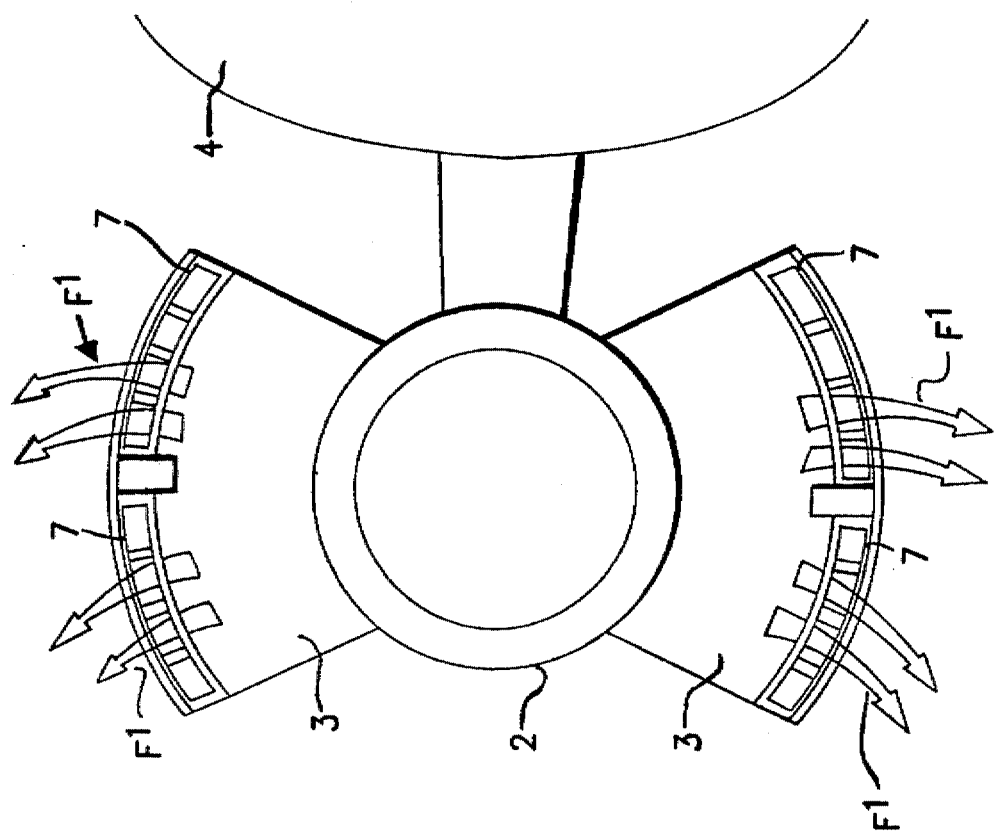
FIG. 3b is a front view of an engine mounted on a rear fuselage showing the present invention.
Figure 6:
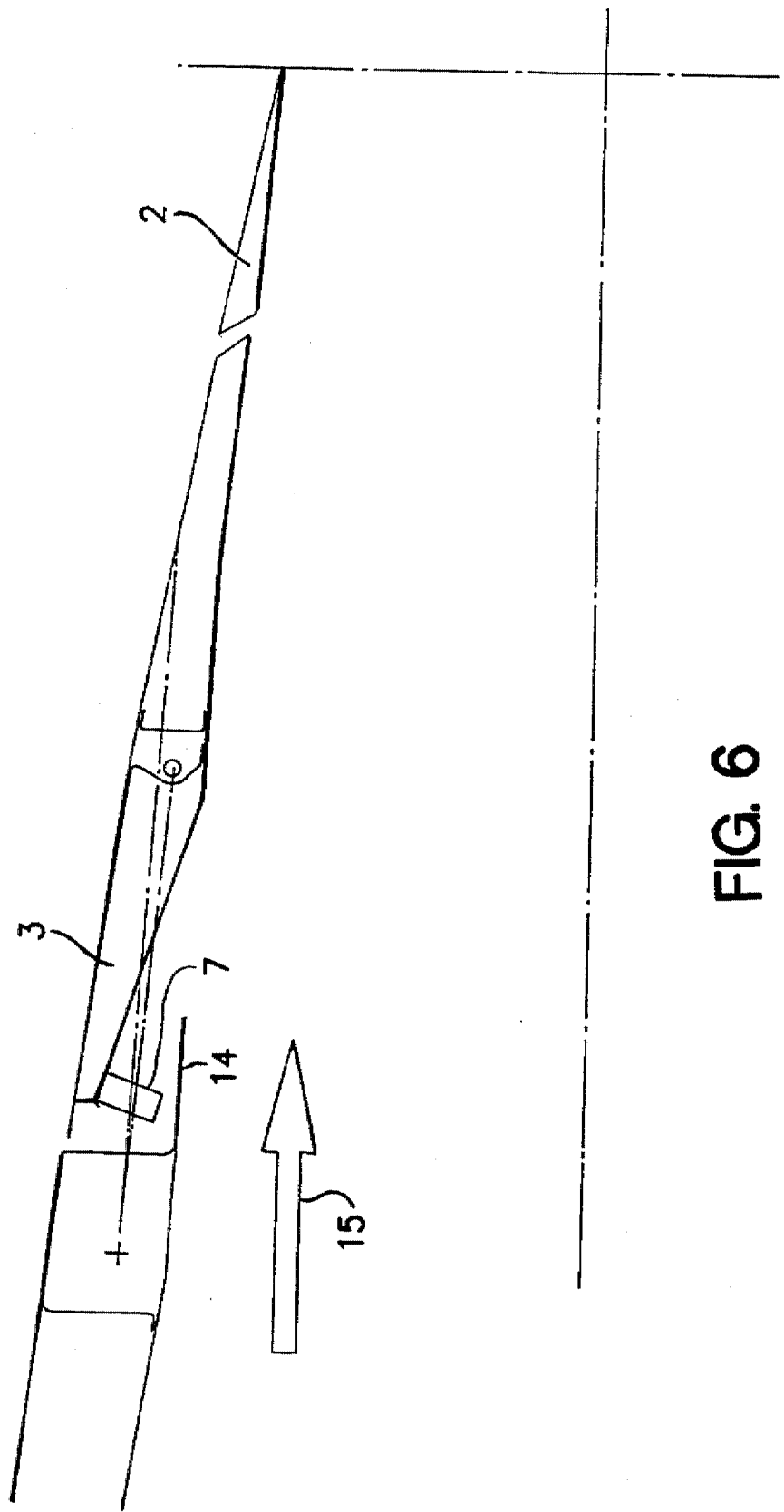
FIG. 6 is a side view of the thrust reverser in the stow mode corresponding to the present invention.
Figure 7:
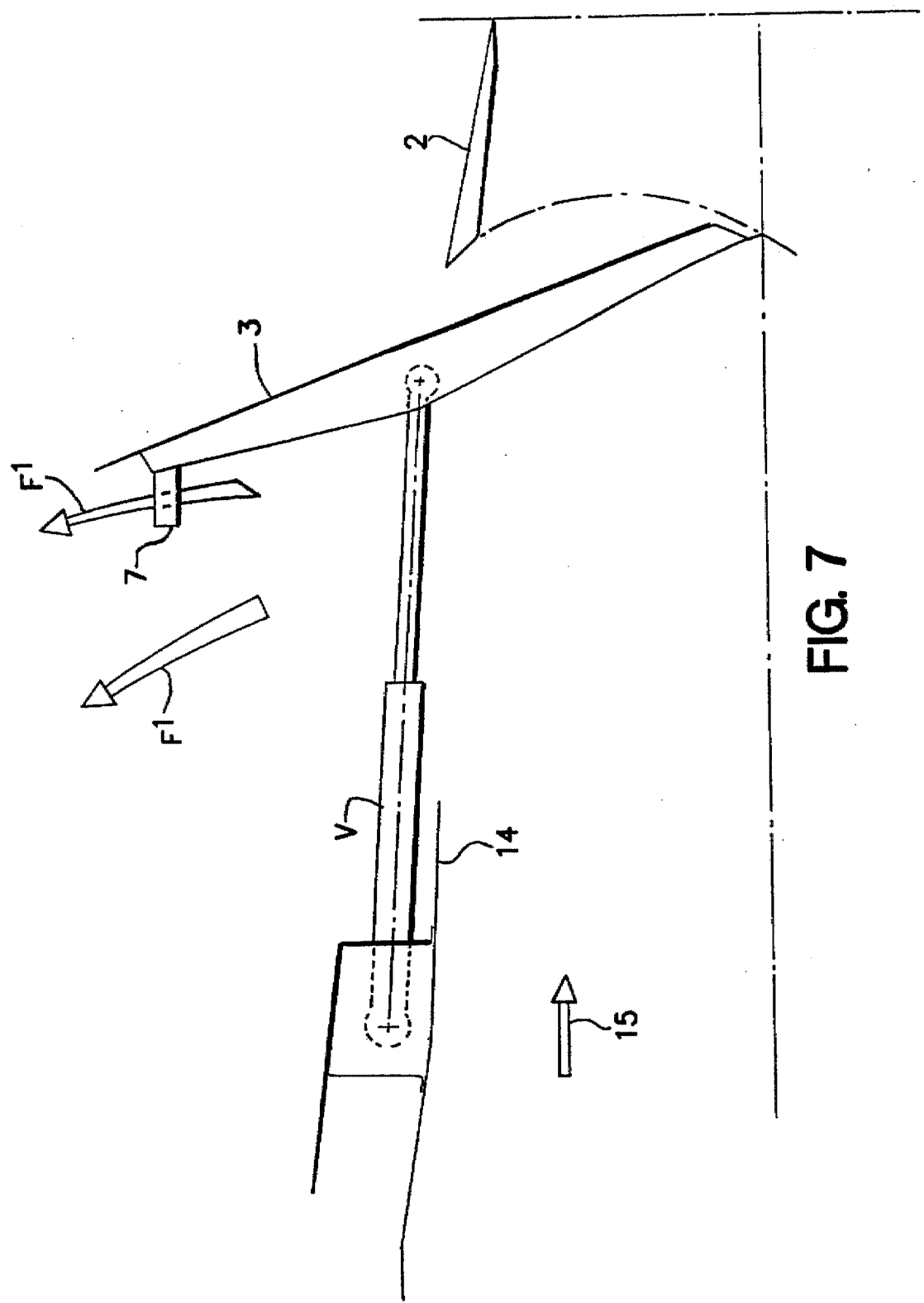
FIG. 7 is a side view of the thrust reverser in the deploy mode corresponding to the present invention.

Referring now to FIGS. 3a, 3b and 4, it will be seen that the thrust reverser assembly 2 has two pivoting doors 3 which are articulated around axes 6 by an actuator V on each door, from a stowed position (FIG. 6) to a deployed position (FIG. 7).

When deployed the doors block the flow 15 and reverse the flow in a forward and radial direction F1. According to the invention, on the forward extremity of each door 3 are two individual flow deflector boxes 7 (due to the presence of the actuator V, a single deflector box cannot be used).

These deflector boxes 7 are efflux control devices. During normal landing or in the event of an in-flight accidental deployment of the doors 3, these deflector boxes 7 will turn the reversed airflow away from the fuselage 4 and tail structure 5. In FIG. 3 the direction of the reversed flow is depicted by the arrows F1.

As shown on FIG. 7, the deflector boxes 7 are installed on the door extremity in such a manner as to be parallel to the engine axis, thereby improving the radial capability of the reversed flow F1.

Figure 5:
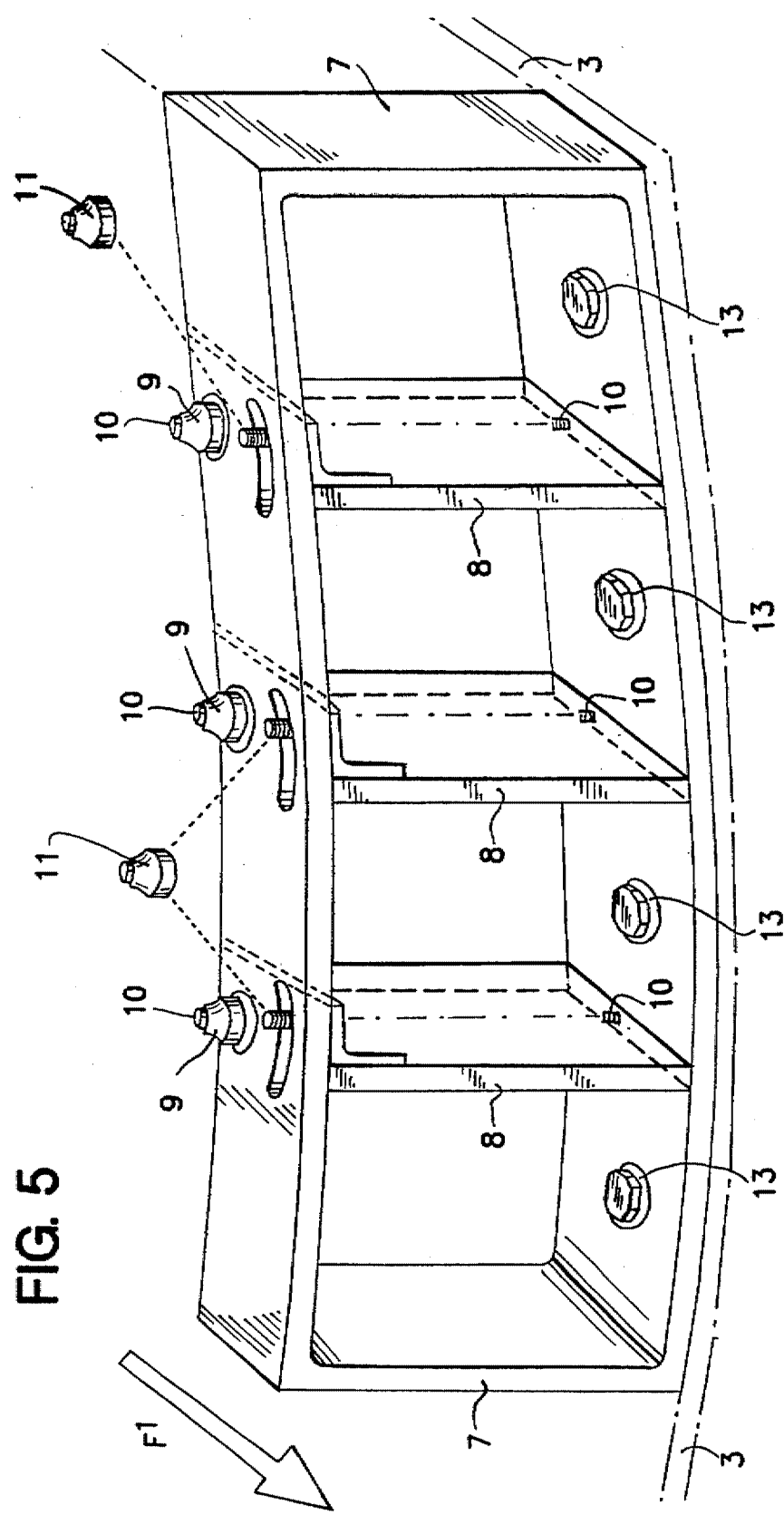
FIG. 5 is a perspective view of the deflector box assembly.

The deflector boxes are bolted on line replaceable units that can be changed on the aircraft as required. As shown in FIG. 5, the deflector box 7 comprises individual deflectors 8 which can be pivoted and oriented to direct the flow in a desired direction. The orientation of the deflector angles can be performed by the simple maintenance operation described.

The adjustment is made by loosening the nut 9 on the threaded pivot stud 10 integrated into the deflector 8.

The nut 11 is then loosened to allow the deflector 8 to be moved through the slot 12 in order to obtain the desired orientation.

As illustrated, the deflector box assembly 7 is bolted to the pivoting door 3 by four hex head bolts 13. The lower outboard box assembly, shown in FIG. 5, is taken from the FIG. 4 thrust reverser in deploy mode.

It should be noted that when the pivoting doors are stowed, the deflector boxes are further forward than the aft edge of the fan duct fairing 14, thereby being shielded from the airflow 15, as illustrated in FIG. 6.

Thus, the described thrust reverser system of the present invention can be seen to improve the efflux control when in the reverse mode, without a degradation of performance in the cruise mode with the thrust reverser stowed.

We claim:

1. A thrust reverser for a turbo-fan engine with mixed hot and cold airflow, said thrust reverser being mounted on the aft fuselage of an aircraft, the thrust reverser comprising:

thrust reversing pivoting doors, installed forward of an aft ring exit nozzle structure, and movable from a stowed position in which they complete a fan duct fairing of the engine and do not interfere with said airflow to a deployed position in which they block the mixed airflow and direct it in a forward direction, according to a reverse thrust efflux pattern;

a pivoting door actuator attached to the center of each pivoting door for moving the door from said stowed position to said deployed position;

deflector box assemblies, on each door forward extremity, mounted perpendicularly to the door, in order to direct said reverse thrust efflux pattern away from the aircraft fuselage and tail surfaces, each deflector box assembly comprising:

a box frame without front and back plates, a plurality of deflectors that pivot within the box frame and that can be oriented to a desired angle in order to control the efflux flow pattern.

2. A thrust reverser in accordance to claim 1, wherein when the pivoting doors are in the stowed position, the deflector box assemblies are located further then the aft edge of the fan duct fairing, whereby the deflector boxes are shielded from the mixed airflow by the fan fairing, thereby not perturbing the airflow performance.

3. The thrust reverser in accordance to claim 1, wherein the deflector box assemblies are installed on the door extremity in a manner to be parallel to the engine axis, when the pivoting doors are in the deployed position, thereby improving the radial capability of the efflux control.

* * * * *